United States Patent
Booker

(10) Patent No.: US 6,655,466 B2
(45) Date of Patent: Dec. 2, 2003

(54) SOD CUTTER/DICER

(76) Inventor: Mark E. Booker, 1445 W. Haynes Rd., Othello, WA (US) 99344

(*) Notice: Subject to any disclaimer, the term of this patent is extended or adjusted under 35 U.S.C. 154(b) by 0 days.

(21) Appl. No.: 09/853,997

(22) Filed: May 11, 2001

(65) Prior Publication Data

US 2002/0166678 A1 Nov. 14, 2002

(51) Int. Cl.$^7$ .............................................. A01B 45/04
(52) U.S. Cl. ....................................................... 172/19
(58) Field of Search ................................ 172/19, 20, 21, 172/142, 178, 197, 198, 313, 615, 617, 618, 619–624, 643, 646, 657

(56) References Cited

U.S. PATENT DOCUMENTS

| | | |
|---|---|---|
| 654,548 A | 7/1900 | Latisniere |
| 748,675 A | 1/1904 | Weber |
| 922,178 A | 5/1909 | Nelson |
| 1,040,890 A | 10/1912 | Cook |
| 1,258,930 A | 3/1918 | Nesterud |
| 1,618,076 A * | 2/1927 | Fromherz ................... 172/152 |
| 2,534,838 A | 12/1950 | Wall |
| 2,613,581 A * | 10/1952 | Pretzer ......................... 172/19 |
| 2,614,477 A | 10/1952 | Habenicht |
| 3,357,499 A | 12/1967 | Finneyfrock |
| 3,753,409 A | 8/1973 | Frazier |
| 3,856,090 A | 12/1974 | Haffner et al. |
| 4,127,178 A * | 11/1978 | Blair ........................... 172/198 |
| 4,577,697 A * | 3/1986 | Moak ............................ 172/21 |
| 5,653,292 A * | 8/1997 | Ptacek et al. .................. 172/4 |
| 6,135,211 A | 10/2000 | Schroeder |

OTHER PUBLICATIONS

Color Brochure Advertising Stream Wash® Multi–sided Discharge Power Wash Sink, Undated, three pages.

* cited by examiner

*Primary Examiner*—Robert E. Pezzuto
(74) *Attorney, Agent, or Firm*—Spencer Fane Britt & Browne, LLP

(57) ABSTRACT

An apparatus is provided to facilitate sod destruction and decomposition by cutting and crushing primarily horizontal roots and rhizomes while leaving vertical roots uncut. Multiple gangs of colters are attached to a frame, the colter gangs are arranged in staggered relation with respect to each other. The staggered relationship of the colter gangs allows the apparatus to cut relatively narrow strips of sod. A method of operating the apparatus is provided in which the apparatus is operated across a sod field in a first direction to cut the field into long, narrow strips of sod. The apparatus is then operated across the same field in a direction relatively perpendicular to the first direction, cutting the strips of sod into small pieces.

13 Claims, 4 Drawing Sheets

SOD CUTTER/DICER

FIELD OF THE INVENTION

The present invention relates to a machine to facilitate sod destruction and decomposition, and a method of using the machine. The machine comprises multiple colters positioned to cut and crush sod horizontal roots and rhizomes while leaving vertical net roots uncut. The method of using the machine comprises making multiple passes over a sod field in a criss-crossing pattern.

BACKGROUND OF THE INVENTION

Destruction of sod is a difficult soil working process that is desirable when planting certain row crops and root crops. Row crops require proper tilth of a seed-bed, which cannot be obtained when large clumps of sod are present. Root crops, such as potatoes, cannot be separated from large clumps of sod during harvest. Therefore, adequate destruction of sod for row and root crops requires that the sod be reduced into small, untangled segments that allows planting and harvesting of crops. Such a result could be accomplished if a machine were capable of cutting horizontal roots and rhizomes, while leaving vertical roots uncut to hold the sod in position for the cutting of the horizontal roots.

Many machines have been developed for working soil including plows, tillers, disks, cultivators, and sod cutters. These machines are generally designed to cut both horizontal and vertical roots of sod or stubble to accomplish the desired soil working process. Such machines tend to leave large clumps of sod in a field, which significantly increases the time necessary for proper sod destruction and decomposition. Until the discovery of the instant invention, no soil working machine or apparatus has been developed to facilitate the destruction and decomposition of sod by cutting horizontal roots and rhizomes while leaving vertical net roots uncut.

Machines to cut and roll sod for turf installation are well known. Such machines are designed primarily to cut all vertical roots of an area of sod and secondarily to cut a limited perimeter portion of vertical roots of the sod. Because the horizontal roots are only cut around the perimeter of the area of sod, the sod can be rolled up as a single piece and then transported to another location for turf installation. An example of such a sod cutting and rolling machine is disclosed in U.S. Pat. No. 6,135,211, which issued Oct. 24, 2000 to Schroeder. The sod cutting machine of Schroeder includes two side-cutting blades, and a lower cutting blade. One side-cutting blade is mounted on each side of the lower cutting blade. The side-cutting blades are positioned to cut the horizontal roots on each side of a strip of sod, while the lower cutting blade is positioned to cut the vertical roots below the strip of sod. Although this machine is effective in removing sod from a field, it does not facilitate sod destruction and decomposition within a field. The purpose of Schroeder's machine is to preserve the sod for re-installation, rather than to destroy and decompose the sod within the field.

Several prior art machines have been developed to facilitate the destruction and decomposition of sod. For example, U.S. Pat. No. 1,040,890, which issued on Oct. 8, 1912 to Cook, discloses a motor plow to slice or cut sod and plow the soil below the sod. Cook's invention shows two gangs of rotary disks arranged at the front and rear of a frame, and one or more plows positioned between the gangs of disks. The plows can be raised and lowered to control their operation. The angles of the disks with respect to the line of movement of the machine can be varied to increase and decrease the cultivation action of the disks. When the planes of the disks are parallel to the line of movement, the disks operate only as wheels with no cultivating action. A significant disadvantage of this machine is that the angle of the disks needed to cultivate the sod result in cutting the vertical roots of the sod while leaving a significant amount of horizontal roots and rhizomes fully intact. By cutting vertical roots and leaving horizontal roots intact, this machine will leave rather large clumps of sod loose in a field. These large clumps of sod will take a significant period of time to decompose. Additionally, once the vertical roots have been cut and a clump is loosened from the soil, further destruction of that clump by additional passes with the machine is curtailed as the disks will tend to merely push the clump aside rather than cut the remaining horizontal roots of the clump. Therefore, it would be advantageous to develop a machine that cuts primarily the horizontal roots of sod, while leaving the vertical roots uncut to hold the sod in position during the cutting of the horizontal roots.

U.S. Pat. No. 922,178, which issued on May 18, 1909 to Nelson and U.S. Pat. No. 1,258,930, which issued on Mar. 12, 1918 to Nesterud disclose several quack grass destroyer machines which cut sod into strips, lift the strips of sod from the ground, remove soil from sod roots, and then return the sod to the ground for decomposition. Both of these machines require rather bulky and complex mechanisms to lift the strips of sod from the ground and remove the soil from the roots. Therefore, it would be advantageous if a machine could be developed that would facilitate the destruction of sod without requiring a complex mechanism to lift the sod from the ground and remove the soil from the roots.

SUMMARY OF THE INVENTION

A principal object of the present invention is to provide an improved machine to facilitate the destruction and decomposition of sod within a field.

Another object of the present invention is to provide a machine to facilitate the destruction and decomposition of sod within a field without requiring temporary removal of the sod from the field for sod destruction.

Another object of the present invention is to provide a machine to facilitate the destruction and decomposition of sod within a field by cutting and crushing primarily horizontal roots and rhizomes while leaving vertical net roots uncut.

The above described objectives are achieved using an apparatus comprising a frame, and at least a first and second gang of colters mounted to the frame. The second gang of colters is mounted behind the first gang of colters in a staggered relationship with respect to the first gang of colters. The cutting edge of each individual colter is positioned in a direction parallel to the direction of travel of the apparatus, such that as the apparatus moves in a forward direction over a field of sod, the horizontal roots of the sod will be cut in a straight line parallel to the direction of forward movement. The precise positioning of the cutting edges of the colters allows the apparatus to cut primarily horizontal roots and rhizomes without cutting vertical roots.

One embodiment of the apparatus of the instant invention includes wheels mounted to the frame, the height of the wheels can be adjustable to control the depth that the colters cut into the sod. Additionally, the wheels can be used to raise the colters entirely above the ground to allow the apparatus to be transported easily from field to field.

In another embodiment, the spacing between individual colters in a given gang can be adjusted by using spacers of varying widths. Additionally, each gang of colters can be adjusted horizontally from side to side of the apparatus. The horizontal adjustment allows for the repositioning of the colter gangs to maintain the staggered relationship of the gangs when spacer widths are modified.

The apparatus must be of sufficient weight to allow the colters to penetrate the roots of the sod. Weight blocks can be added to the frame if additional weight is required.

In operation, the apparatus moves in a forward, relatively straight, first direction across a field of sod. As the first gang of colters is pulled across the sod, it will cut the horizontal roots and rhizomes of the sod such that strips of sod are formed. The second gang of colters is pulled across the strips of sod; due to the staggered relationship of the second gang of colters with respect to the first gang of colters, the strips of sod are cut into increasingly smaller strips of sod. The staggered relationship of the colter gangs allows the sod to be cut into widths substantially narrower than that which may be achieved by a single gang of colters. As many additional gangs of colters can be positioned behind the second gang of colters as needed to obtain a desired strip width. Once a first pass over a field of sod is made, the apparatus can be pulled over the same field in a direction relatively perpendicular to the first direction. This second pass allows the strips of sod to be cut into small segments. Because the colters are positioned to only cut horizontal roots and rhizomes, the intact vertical roots will hold the sod in position for the second gang of colters, any additional gangs of colters, as well as additional passes with the machine.

As the colters are pulled across a field of sod, the action of cutting provides a secondary advantage of crushing the horizontal roots and rhizomes of the sod near the incision point of each colter. This crushing action loosens horizontal root hairs from the soil, which increases the destruction and decomposition of the sod. This crushing action is generally isolated to a relatively small area near the incision point of a colter. As a result the crushing action will only provide a considerable advantage when a field of sod is cut using the apparatus of the instant invention which cuts the sod into narrow strips. When a strip of sod is cut too wide, the crushing action of the colters will not sufficiently loosen the horizontal roots from the soil across the entire width of the strip of sod.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention.

DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

DESCRIPTION OF THE PREFERRED EMBODIMENTS

Preferred embodiments of the present invention are hereinafter described with reference to the accompanying drawings.

Figure 1:
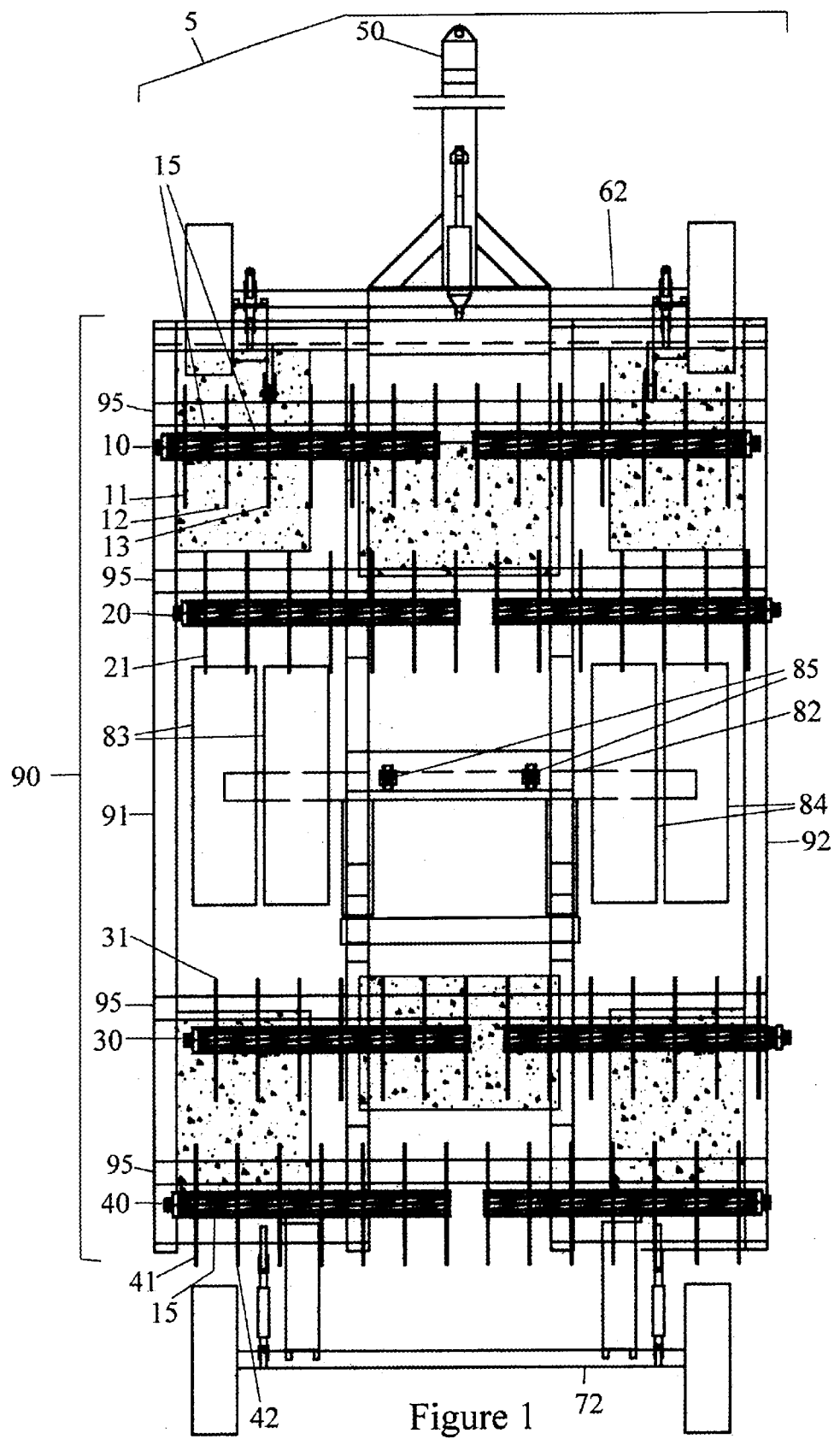
FIG. 1 is a plan view of a preferred embodiment of the Sod Cutter/Dicer invention.

Referring to FIG. 1, a plan view of a Sod/Cutter Dicer apparatus 5 having four gangs of colters mounted to frame 90 is presented. The individual colters within each gang of colters are spaced equal distances apart from each other using spacers 15. For example, in front gang 10, the distance between colters 11 and 12 is the same distance as the distance between colters 12 and 13. Additionally, the spacing between individual colters is the same for each colter gang. For example, the spacing between colters 11 and 12 of gang 10 is identical to the distance between colters 41 and 42 of rear gang 40.

FIG. 1 shows the staggered relationship of colter gangs 10, 20, 30, and 40 with respect to each other. Interior colter gang 20 is positioned such that the individual colters of gang 20 split the distance between the individual colters of gang 10. As is shown in FIG. 1, colter 21 of gang 20 is aligned between colters 11 and 12 of gang 10. Interior colter gang 30 and rear colter gang 40 are positioned as a collective unit to split the distance created between the colters of gang 10 and gang 20. As is shown in FIG. 1, colter 31 of gang 30 splits the distance created between colter 12 of gang 10 and colter 21 of gang 20, and colter 41 of gang 40 splits the distance created between colter 11 of gang 10 and colter 21 of gang 20. Working together, colters 11, 12, 21, 31, and 41 will cut a section of sod into four (4) narrow strips.

Optimum sod decomposition is achieved when the staggering of colter gang 10, 20, 30 and 40 is such that 11, 12, 21, 31, and 41 will cut a section of sod into four sections of uniform widths. In the preferred embodiment, the size of spacers 15 is such that the sod will be cut into strips having a uniform width of 0.8 to 2.0 inches. The varying width is accomplished by changing the width of spacers 15. Although the preferred embodiment achieves uniform strip width by making all of spacers 15 the same width, it is also possible to achieve a uniform strip width using spacers of varying widths in the first (or leading) colter gang as long as the colters of the subsequent colter gangs are spaced appropriately to subdivided the colters of the leading colter gang. It is important that the colter spacing and gang staggering of apparatus 5 be arranged to cut the sod into the desired strip widths in a single pass. This is due to the fact that it will be extremely difficult, if not impossible, for an operator of the apparatus to operate the apparatus in a direction uniformly parallel to, and staggered with respect to, the first pass to further narrow the strips of sod.

As can be seen from FIG. 1, the cutting edge of each colter of colter gangs 10, 20, 30 and 40 is positioned in a direction parallel to sides 91 and 92 of frame 90, or ultimately the direction of travel of apparatus 5, such that as apparatus 5 moves in a forward direction over a field of sod, the horizontal roots of the sod will be cut in a straight line parallel to the direction of forward movement. This precise positioning of the cutting edges of the colters allows the apparatus to cut primarily horizontal roots and rhizomes without cutting vertical roots.

Figure 3:
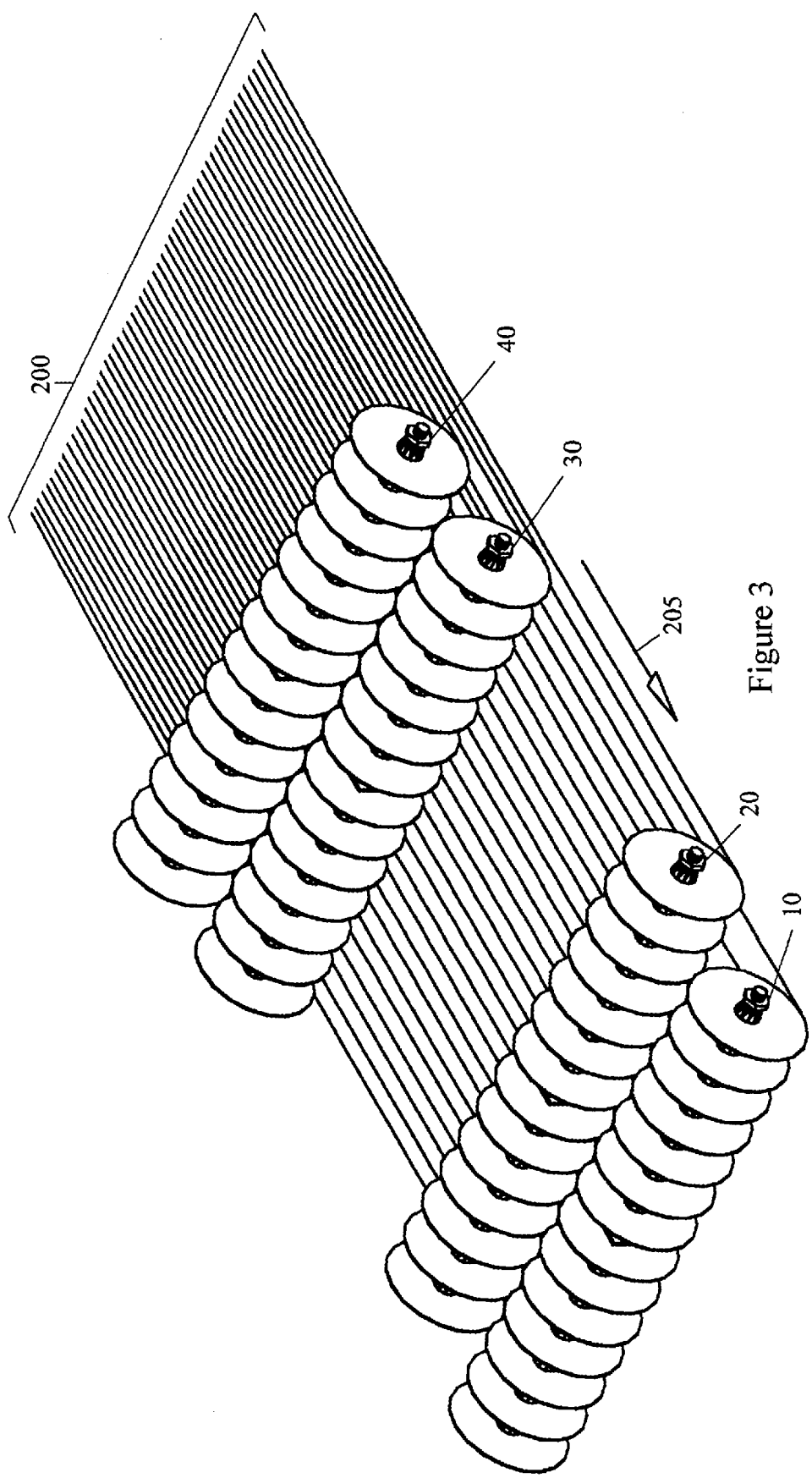
FIG. 3 is a perspective view showing the forward direction cutting pattern of four staggered gangs of colters.
Figure 4:
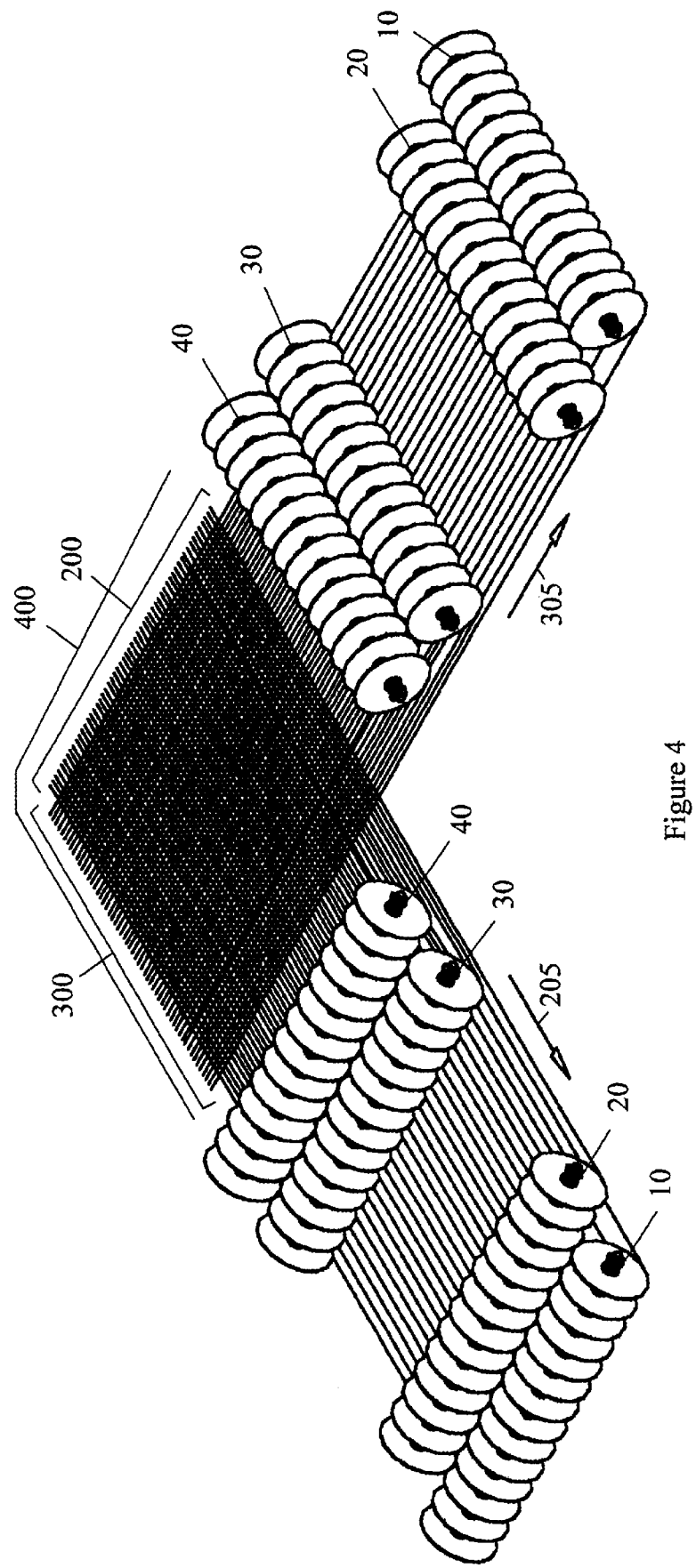
FIG. 4 is a perspective view showing the forward and perpendicular direction cutting patterns of the staggered gangs of colters from FIG. 3.

FIGS. 3 and 4 show the parallel cutting patterns created by the colters of gangs 10, 20, 30 and 40. In FIG. 3, cutting pattern 200 represents the cuts that will be made by colter gangs 10, 20, 30 and 40 when Sod Cutter/Dicer 5 is pulled in a relatively straight forward direction. As can be seen from FIG. 3, the colters of gang 10 will make narrow strips of sod. Colter gang 20 then further cuts in half each strip of sod which has already been cut by gang 10. Gangs 30 and 40 will then collectively cut in half the strips of sod that have been cut by gangs 10 and 20. FIG. 4 shows the relationship between cutting pattern 200 made in first direction 205 and cutting pattern 300 made in second direction 305 which is substantially perpendicular to first direction 305. As can be seen from FIG. 4, overlap 400 of cutting pattern 200 and cutting pattern 300 results in numerous small rectangular pieces of sod.

The spacing between the individual colters of colter gangs 10, 20, 30 and 40 can be adjusted by varying the widths of spacers 15. When the colter spacing is adjusted, it will also be beneficial to adjust the alignment of colter gangs 10, 20, 30 and 40 with respect to each other to obtain the proper staggering relationship. The alignment can be adjusted by mounting each of colter gangs 10, 20, 30 and 40 such that they can be repositioned from side to side (i.e. perpendicular to the direction of forward movement) of the apparatus. To allow for the side to side movement of the colter gangs, each of gangs 10, 20, 30 and 40 is supported by mounting clamps 96 that connect the colter gangs to cross-members 95 mounted between sides 91 and 92 of frame 90. Cross-members 95 can be constructed using a square steel tubing. A separate cross-member is positioned across frame 90 to support each particular colter gang. The mounting clamps of a particular colter gang are bolted to a cross-member, when the bolts are loosened, the clamps are permitted to slide along the length of the cross-member, enabling the adjustment of the position of the colter gang between left side 91 and right side 92. Once the proper alignment between gangs 10, 20, 30 and 40 is achieved, the bolts can be re-tightened to hold the gangs in position.

Figure 2:
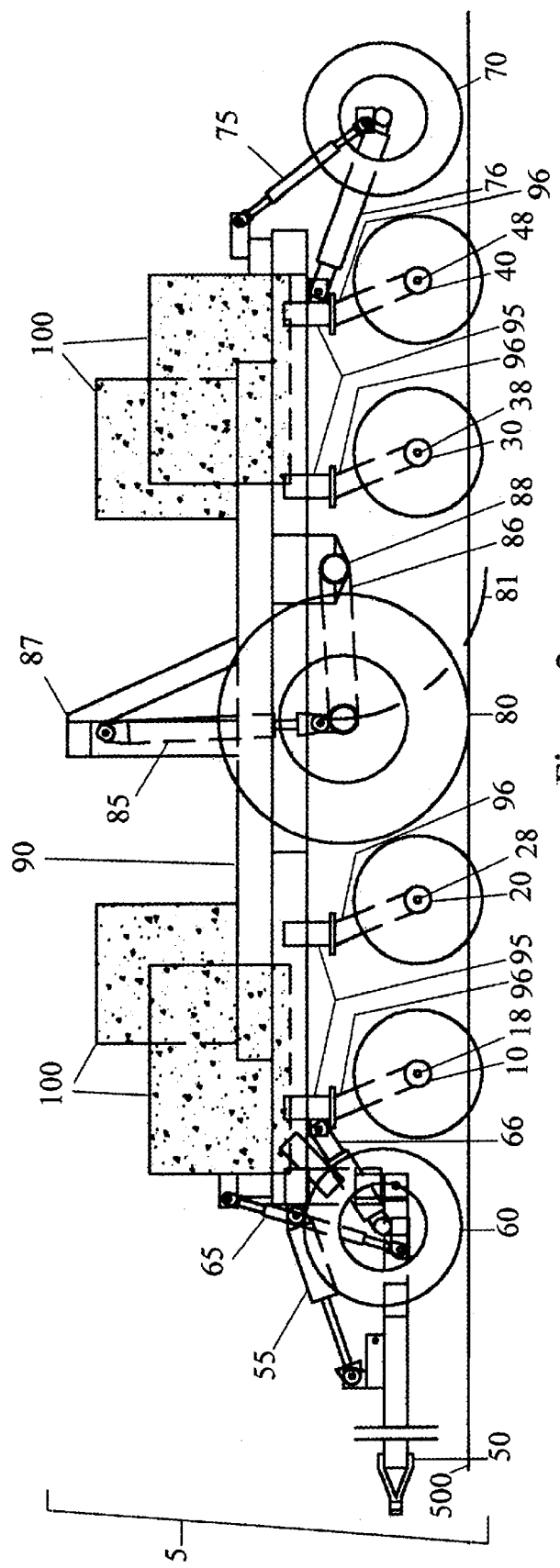
FIG. 2 is a side elevation view of the preferred embodiment of the Sod Cutter/Dicer invention shown in FIG. 1.

As can be seen from FIG. 2, the colters of the preferred embodiment are circular in shape; however, colters of any shape or design may be employed in the instant invention. The individual colters and spacers of a colter gang are all held together by a single gang bolt passing through the center of each colter and spacer. Gang bolts 18, 28, 38 and 48 hold together the colters and spacers of gangs 10, 20, 30 and 40 respectively. The mounting clamps that connect the colter gangs to the frame cross-members are connected to the colter gangs at a bearing connection on the gang bolts.

FIG. 2 shows the penetration of the colters of gangs 10, 20, 30 and 40 into ground 500. The total depth of penetration into ground 500 can be varied by adjusting the height of depth controlling wheels 60, 70, and 80. Additionally, depth controlling wheels 60, 70, and 80 maintain a uniform colter penetration depth for the entire apparatus. Depth controlling wheels 60 and 70 are gauge wheels positioned at the front and back of frame 90 respectively. Front gauge wheels 60 prevent Sod Cutter/Dicer apparatus 5 from tipping forward during operation, while rear gauge wheels 70 prevent Sod Cutter/Dicer apparatus 5 from tipping backwards during operation. Depth controlling wheels 80 are raising (or turning) wheels positioned towards the center (from front to back) of frame 90. Depth controlling wheels 80 could also be placed at the rear of the machine in place of axle 72. Hitch 50 would have to be trussed and reinforced to support the weight of the machine but would be of similar hinged and hydraulic cylinder(s) design. The height of raising wheels 80 can be adjusted to raise the entire Sod Cutter/Dicer apparatus, including gauge wheels 60 and 70, above the ground. When the height of raising wheels 80 is such that the sole point of contact between the Sod Cutter/Dicer and the ground is via wheels 80, the apparatus can easily be turned around or transported between fields.

In the preferred embodiment, a standard truck/trailer dual axle is utilized for raising wheels 80. Left raising wheels 83 are connected to right raising wheels 84 via axle 82. Axle 82 is connected to support tower 87 of frame 90 via a pair of hydraulic cylinders, one on each side of axle 82. Hydraulic cylinders 85 are rotatably connected to support tower 87. Axle 82 is further connected to frame 90 via a pair of pivotal guides, one on each side of axle 82. Pivotal guides 86 are rotatably connected to frame 90 at pivot bushings 88. In operation, hydraulic cylinders 85 are expanded to lift the Sod Cutter/Dicer apparatus. As hydraulic cylinders 85 expand, raising wheels 80 will be directed by pivotal guides 86 to follow raising arc path 81. Pivotal guides 86 ensure that each side of axle 82 follows the same arc path, this ensures that each side of the apparatus will maintain a uniform height above the ground.

Front and rear gauge wheels, 60 and 70 respectively, operate in a similar fashion to raising wheels 80. Each include an axle connecting a left an right wheels. Front axle 62 is connected to frame 90 via a pair of turnbuckles 65 and a pair of pivotal guides 66. Rear axle 72 is connected to frame 90 via a pair of turnbuckles 75 and a pair of pivotal guides 76. As both the front and rear gauge wheels operate in the same fashion, their operation shall now be described with reference to rear gauge wheels 70. Turnbuckles 75 are extended to raise the rear of the apparatus. Pivotal guides 76 are rotatably connected to frame 90. As turnbuckles 75 extend, pivotal guides will direct rear gauge wheels 70 along an arc path similar to the arc path followed by raising wheels 80.

In operation Sod Cutter/Dicer apparatus 5 is pulled by a tractor attached to hitch 50; however a similar apparatus that is self propelled would also be within the scope of the instant invention. Hitch 50 is rotatably connected to frame 90. As Sod Cutter/Dicer apparatus 5 is raised using raising wheels 80 along arc path 81, the raising wheels will be positioned towards the rear side of the center of the apparatus. This off-center wheel position results in the apparatus being front heavy. Hydraulic hitch cylinder 55 is rotatably attached to the front of frame 90. Hydraulic hitch cylinder extends from the front of frame 90 towards the front of hitch 50. As the Sod Cutter/Dicer apparatus is raised using raising wheels 80, hydraulic hitch cylinder 55 is extended to push down on the front of hitch 50. This prevents the Sod Cutter/Dicer apparatus from tilting forward. In the preferred embodiment hydraulic cylinders 55 and 85 are controlled by pumps located on the tractor.

Weight blocks 100 can be placed on frame 90 to provide sufficient weight for adequate colter penetration through sod surface 500.

The method of using the apparatus of the instant invention to facilitate the destruction and decomposition of sod is accomplished by making a first pass over a sod field with the apparatus in first direction 205 and then making a second pass over the same sod field with the apparatus in second direction 305. As is shown in FIG. 4, second direction 305 is made approximately ninety degrees to first direction 205. This method works best when the soil moisture holding capacity for the sod field is between seventy-five to ninety percent of the field capacity for the sod field.

In operation, the Sod Cutter/Dicer 5 also may include a marker to mark the cutting path. A marker may be advantageous as it is often difficult for the operator of the apparatus to see where the horizontal roots have already been cut in a field of sod. This is due to the fact that the Sod Cutter/Dicer makes precise cuts through the sod, without removing sod chunks or otherwise disrupting the field surface. The marker can comprise a wheel or disk that is drug along the side of the apparatus, leaving a visible line in the field for the operator to see.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense. For example, it is appreciated that hydraulic cylinders and turnbuckles can be substituted for one another in the instant invention. Additionally, it is appreciated that other similar devices may be substituted to accomplish the same function.

Having now described the features, discoveries and principles of the invention, the manner in which the inventive Sod Cutter/Dicer is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

Having thus described the invention what is claimed as new and desired to be secured by Letters Patent is as follows:

1. An apparatus to facilitate sod destruction and decomposition by cutting primarily horizontal roots and rhizomes while leaving vertical roots uncut, the apparatus comprising:
    a frame;
    a first gang of colters mounted to said frame, each colter of said first gang including a generally planar vertical cutting edge;
    a second gang of colters mounted to said frame, said second gang of colters being mounted in a staggered relationship with respect to said first gang of colters, each colter of said second gang including a generally planar vertical cutting edge; and
    weight blocks removably positioned on said frame.

2. The apparatus as claimed in claim 1 further comprising depth controlling wheels mounted to said frame.

3. The apparatus as claimed in claim 2 wherein a height of said depth controlling wheels is adjustable by hydraulics, said hydraulics connecting said depth controlling wheels to said frame.

4. The apparatus as claimed in claim 1 further comprising a hitch mounted to said frame adapted to connect said frame to a tractor.

5. The apparatus as claimed in claim 1 wherein at least one of said first and second gang of colters includes an adjustment.

6. The apparatus as claimed in claim 5 wherein said adjustment comprises a colter spacer positioned between a first and a second colter of said at least one of said first and second gang of colters.

7. The apparatus as claimed in claim 5 wherein said adjustment comprises a movable mount for positioning said at least one of said first and second gang of colters.

8. A method of using the apparatus claimed in claim 1 to facilitate the destruction and decomposition of sod, wherein the apparatus cuts primarily horizontal roots and rhizomes of sod while leaving vertical roots uncut, the method comprising the steps of:
    making a first pass over a sod field with the machine in a first direction;
    making a second pass over said sod field with the machine in a second direction, said second direction being a direction approximately ninety degrees to said first direction.

9. The method as claimed in claim 8 wherein a soil moisture holding capacity for said sod field is between seventy-five to ninety percent of a field capacity for said sod field.

10. The method as claimed in claim 8 further including the step of marking a cutting path.

11. An apparatus to facilitate sod destruction and decomposition by cutting primarily horizontal roots and rhizomes while leaving vertical roots uncut, the apparatus comprising:
    a frame;
    a first gang of colters mounted to said frame, each colter of said first gang of colters including a generally planar vertical cutting edge;
    a second gang of colters mounted to said frame, said second gang of colters being mounted in a staggered relationship with respect to said first gang of colters, each copter of said second gang of colters including a generally planar vertical cutting edge;
    a third gang of colters mounted to said frame, said third gang of colters being mounted in a staggered relationship with respect to said first gang and said second gang of colters, each colter of said third gang of colters including a generally planar vertical cutting edge; and
    weight blocks removably positioned on said frame.

12. The apparatus as claimed in claim 11 further comprising a fourth gang of colters mounted to said frame, said fourth gang of colters being mounted in a staggered relationship with respect to said first gang, said second gang, and said third gang of colters, each colter of said fourth gang of colters including a generally planar vertical cutting edge.

13. A method of facilitating sod destruction and decomposition, said method comprising the steps of:
    arranging vertically cutting edges of colters of at least a first and second gang of colters to cut primarily horizontal roots and rhizomes while leaving vertical roots uncut;
    passing over at least a portion of a sod field with said first gang of colters;
    passing over said portion of said sod field with a second gang of colters, said second gang of colters positioned to pass in a staggered relationship with respect to said first gang of colters; and
    removably positioning weight blocks in association with the colters to distribute weight to the colters.

* * * * *